United States Patent
Noor et al.

(10) Patent No.: US 8,428,905 B2
(45) Date of Patent: Apr. 23, 2013

(54) SYSTEM AND METHOD FOR AUTO TRIGGERING OF A DATA ACQUISITION DEVICE

(75) Inventors: Gad Noor, Givatayim (IL); Jacob Gabay, Rosh-Ha'Ayin (IL); Dmitry Slomov, Tel-Aviv (IL); Jay Paul White, Bohemia, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 708 days.

(21) Appl. No.: 12/431,620

(22) Filed: Apr. 28, 2009

(65) Prior Publication Data

US 2010/0274524 A1    Oct. 28, 2010

(51) Int. Cl.
*G01B 5/02* (2006.01)
*G06K 7/10* (2006.01)

(52) U.S. Cl.
USPC ..................................... 702/158; 235/462.48

(58) Field of Classification Search .................... 702/33, 702/81, 84, 127, 141, 149–150, 152–153, 702/155, 158–159, 182–183, 189, 193; 235/439–440, 454, 461, 462.01, 462.09, 235/462.14, 462.21, 462.25, 462.3, 462.31, 235/462.41–462.42, 462.45, 462.48, 462.49, 235/472.01; 33/1 L, 281–282, 284–285, 33/700–701, 791; 73/1.37, 1.41, 1.56, 1.79
See application file for complete search history.

(56) References Cited

U.S. PATENT DOCUMENTS

| | | | |
|---|---|---|---|
| 5,902,986 A * | 5/1999 | Barkan et al. | 235/462.25 |
| 6,039,258 A | 3/2000 | Durbin et al. | |
| 2006/0032919 A1* | 2/2006 | Shearin | 235/454 |
| 2008/0277477 A1* | 11/2008 | Thuries et al. | 235/462.23 |

FOREIGN PATENT DOCUMENTS

FR    2883398 A1    9/2006

OTHER PUBLICATIONS

International Search Report and Written Opinion dated Jul. 22, 2010 in related case PCT/2010/0032499.
International Preliminary Report on Patentability and Written Opinion for counterpart International Patent Application No. PCT/US2010/032499 mailed on Nov. 10, 2011.

\* cited by examiner

*Primary Examiner* — Toan Le

(57) ABSTRACT

A data acquisition device for an auto triggering thereof includes a movement detector, a distance detector, a processor, and a data acquiring component. The movement detector detects movement data of the data acquisition device. The movement data indicates a state of movement for the data acquisition device. The state of movement is one of static and dynamic. The distance detector detects distance data between the data acquisition device and an object to which data is to be acquired. The processor receives the movement data to determine the state of movement and, when the state of movement is determined to be static, receives the distance data to determine the distance of the object from the data acquisition device. The data acquiring component acquires the data from the object when the processor initially determines that the state of movement is static and subsequently determines the distance is within a predetermined range.

19 Claims, 3 Drawing Sheets

SYSTEM AND METHOD FOR AUTO TRIGGERING OF A DATA ACQUISITION DEVICE

FIELD OF THE INVENTION

The present invention relates generally to a system and method for auto triggering of a data acquisition device (DAD). Specifically, the DAD includes a component to determine movement and a component to determine proximity to an object.

BACKGROUND

A DAD such as a scanner may be used to receive data encoded in an object such as a bar code. Conventionally, the scanner may include a trigger that enables a scanning engine to receive the encoded data. In a first example, the scanning engine may emit light that reflects off the object to receive the data. In a second example, the scanning engine may capture an image of the object. The trigger is manually activated by a user so that the data is received. The trigger is a source for high failure rates such as the trigger not properly activating the scanning engine. The trigger may also cause muscle fatigue to the user especially when the user must scan a large amount of data.

The DAD may be incorporated into a mobile device. The mobile device may include a portable power supply that enables a user to freely use the DAD in a variety of environments without a need for a permanent power supply. The trigger may require a user to activate the scanning engine multiple times in order to properly receive the data from the object. The multiple activations may deplete the portable power supply, thereby shortening the life of the mobile device and requiring more frequent recharging or replacement of the portable power supply.

SUMMARY OF THE INVENTION

The present invention relates to a data acquisition device comprising a movement detector, a distance detector, a processor, and a data acquiring component. The movement detector detects movement data of the data acquisition device. The movement data indicates a state of movement for the data acquisition device. The state of movement is one of static and dynamic. The distance detector detects distance data between the data acquisition device and an object to which data is to be acquired. The processor receives the movement data to determine the state of movement and, when the state of movement is determined to be static, receives the distance data to determine the distance of the object from the data acquisition device. The data acquiring component acquires the data from the object when the processor initially determines that the state of movement is static and subsequently determines the distance is within a predetermined range.

DETAILED DESCRIPTION

Figure 1:
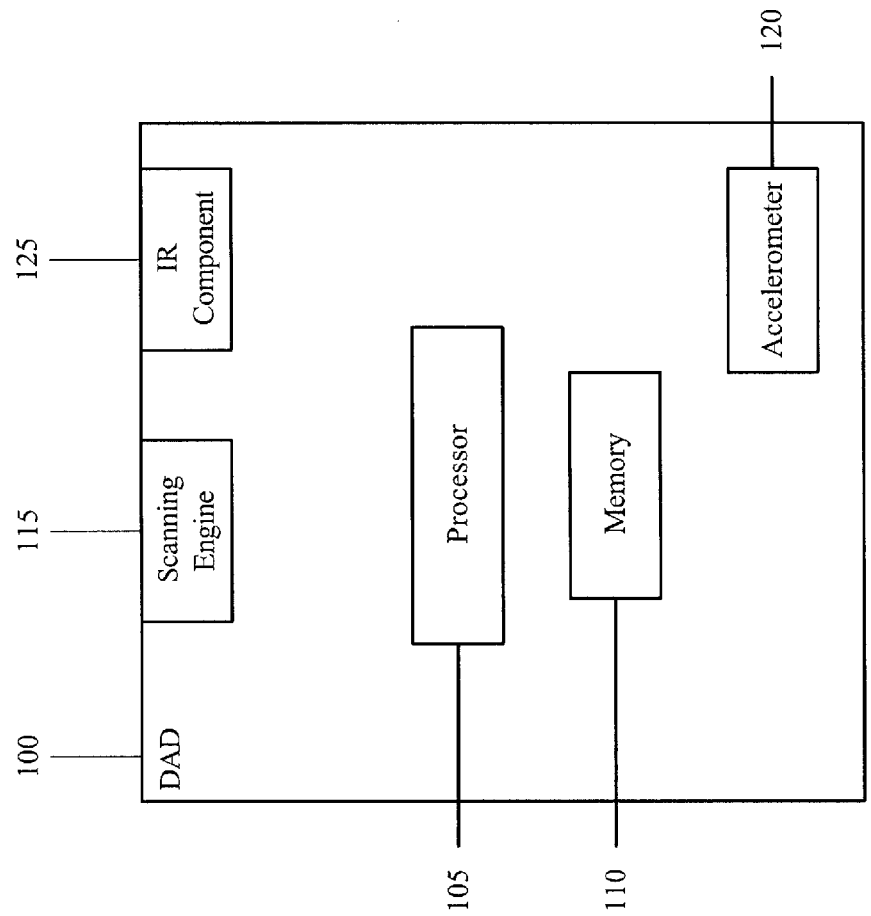
FIG. 1 shows a DAD according to an exemplary embodiment of the present invention.

The exemplary embodiments of the present invention may be further understood with reference to the following description and the appended drawings, wherein like elements are referred to with the same reference numerals. The exemplary embodiments of the present invention describe a system and method for an automatic triggering of a DAD (e.g., an image or laser based scanner, a radio frequency identification (RFID) device, etc.). According to the exemplary embodiments of the present invention, the DAD may include a first component to determine movement and a second component to determine proximity to a scannable object. The DAD, the first component, the second component, and the automatic triggering will be discussed in further detail below.

It should be noted that the term DAD may generally be used to represent any computing device that is capable of acquiring data. For example, the computing device may be a portable device with a scanning engine built therein. It should also be noted that in the description herein, the term scanner and scanning engine may be used interchangeably to represent the DAD and the respective component for the DAD that acquires the data. The computing device may further represent conventional DADs that are modified according to the present invention used in a variety of environments such as a warehouse, market, etc.

The following description will generally refer to the first component as an accelerometer. Those skilled in the art will understand that an accelerometer may be used to determine relative movement of an object to which it is attached or disposed therein. The following description will also generally refer to the second component as an infrared (IR) component. Those skilled in the art will understand that the IR component may be used to determine a relative distance of an object to which data is to be acquired. However, it should be noted that the use of the accelerometer and the IR component is only exemplary and the present invention may utilize any component that is capable of determining a motion and determining a distance, respectively.

FIG. 1 shows a DAD 100 according to an exemplary embodiment of the present invention. The DAD 100 may be a device that requires a permanent power supply or a portable device that includes a portable power supply. The DAD 100 may also be communicatively coupled to a host device for an exchange of data. The DAD 100 may include a processor 105, a memory 110, a scanning engine 115, an accelerometer 120, and an IR component 125.

The processor 105 may be configured to be responsible for the operations and functionalities of the DAD 100. Specifically, the processor 105 may receive encoded data and decode the data. The processor 105 may further determine when the DAD 100 is to be automatically triggered. The processor 105 may receive data from the accelerometer 120 and the IR component 125 and make the determination of automatic triggering. The memory 110 may be a storage unit for the DAD 100. For example, the DAD 100 may store the scanned data and/or the decoded data in the memory 110. The memory 110 may also store the received data from the accelerometer 120 and the IR component 125. Furthermore, the processor 105 may make the determination of performing the automatic trigger based upon comparing the received data from the accelerometer 120 and the IR component 125 by comparing the received data with threshold values stored in the memory 110. The threshold values will be discussed in further detail below. If the DAD 100 is portable, the scanner 100 may further include a battery to provide a power supply (not shown). The battery may be rechargeable.

The scanning engine 115 may perform a scan on an object. For example, the object may be a one-dimensional barcode. According to one exemplary embodiment of the present invention, the scanning engine 115 may be a laser based engine so that a laser is emitted from the scanning engine with a line of sight to the object. A reflection of the laser may be received by the scanning engine 115 to determine an intensity corresponding to encoded data of the object. In another example, the object may be a two-dimensional barcode. According to another exemplary embodiment of the present invention, the scanning engine 115 may be an imager based engine so that an image of the object is captured with a line of sight to the object. Through image processing techniques, the encoded data of the object may be determined. In either example, the encoded data may be interpreted using known techniques to determine the decoded data. It should be noted that other objects may be scanned and a corresponding type of scanning engine 115 may be used. For example, the object may be a color barcode, an optical character recognition (OCR) string, an image, etc. It should again be noted that, as discussed above, the scanning engine 115 may be any component that is capable of acquiring data.

The accelerometer 120 may be a component of the DAD 100 that determines a motion of the DAD 100. The accelerometer 120 may be any conventional device that is configured to determine a relative motion of the DAD 100. The relative motion of the DAD 100 may refer to when the DAD 100 is in motion, in a slowing motion, or in a substantially steady state. The different states may be determined using threshold values. As discussed above, these threshold values may be stored in the memory 110. According to the exemplary embodiments of the present invention, the states may be determined using a motion determining method that is performed using the processor 105. The motion determining method will be discussed in further detail below.

The IR component 125 may be a component of the DAD 100 that determines a distance of an object from the DAD 100. The IR component 125 may determine the distance using conventional methods. For example, the IR component 125 may comprise a transmitter and a receiver. The transmitter of the IR component 125 may transmit an IR beam. If the object is in range of the IR component 125, the IR beam may be reflected back toward the receiver of the IR component 125. Subsequently, a distance may be determined such as by using a time factor. If the object is not in range of the IR component 125, the surface to which the IR beam is to reflect may be too far for the IR beam to be reflected back to the IR receiver, thereby indicating that no object is in range for a scan.

According to the exemplary embodiments of the present invention, the accelerometer 120 may generate data relating to movements made by the DAD 100. The accelerometer 120 may acquire acceleration values to generate the movement data. The movement data may be used by the processor 105 to determine a state of movement for the DAD 100. For example, the DAD 100 may be in a dynamic state where random movements are experienced. In another example, the scanner 100 may be in a slowing state where a speed of the scanner 100 is being reduced (i.e., acceleration is decreasing). In yet another example, the scanner 100 may in a static state where no acceleration is experienced (i.e., not moving or moving at a constant speed).

The motion determining method run by the processor 105 may distinguish between the above described states. For example, the motion determining method may consider acceleration values to distinguish between the slowing state and the static state. In another example, the motion determining method may consider acceleration values to distinguish between the dynamic state and the slowing or static state.

The motion determining method may set threshold values so that when the acceleration is within a range of the threshold values, the processor 105 may determine the state of movement. For example, if the acceleration is above 1G, then the motion determining method may distinguish between the dynamic state and the slowing or static state, thereby enabling the processor 105 to determine that the DAD 100 is in the dynamic state. In another example, if the acceleration is 1G, then the algorithm may determine that the DAD 100 is in either the slowing state or the static state. In a further example, if a change in the acceleration is determined to indicate that the value of acceleration is going toward 1G, then the algorithm may anticipate that the DAD 100 will enter the slowing state or the static state. It should be noted that the use of 1G is only exemplary. According to an exemplary embodiment of the present invention, the motion determining method may consider the constant gravity component contributed to Earth's gravity. For example, the Earth's gravity component may be measured by the accelerometer 120 but may also be filtered when generating movement data for the processor 105. Consequently, the threshold values may be set to not include the Earth's gravity constant. The threshold values will be discussed in further detail below.

During the dynamic state, the DAD 100 may be moving in random directions with random accelerations. However, when a user decides to stop the DAD 100, the motion becomes more organized. That is, the acceleration measured by the accelerometer 120 may indicate that the acceleration becomes closer to a constant value for a duration of time. Thus, when the constant value is reached, the motion determining method determines that the DAD 100 has stopped or is moving at a constant speed.

Furthermore, in determining the state of movement for the DAD 100, the motion determining method may incorporate acceleration values in different directions such as along an x-axis, a y-axis, and a z-axis. As discussed above, when the acceleration values are dynamic in at least one of the axes, the motion determining method may determine that the DAD 100 is in the dynamic state. When the acceleration values are static in all three axes, the motion determining method may determine that the DAD 100 is in either the slowing or steady state.

As discussed above, the motion determining method may use predetermined threshold values to determine the state of movement for the scanner 100. According to the exemplary embodiments of the present invention, the motion determining method may set two threshold values. The first threshold value (hereinafter "1TV") may be set to recognize when the DAD 100 is approaching an end to the dynamic state and a beginning of the slowing state. The second threshold value (hereinafter "2TV") may be set to recognize when the DAD 100 is approaching an end to the static state and a beginning of the dynamic state.

The motion determining method may further incorporate additional threshold values. Specifically, a third threshold value (hereinafter "3TV") may relate to time. The 3TV may be used in combination with the 1TV and the 2TV. The 3TV may indicate a duration in which the DAD 100 remains in a single state of movement during a dynamic state. For example, during the dynamic state, the DAD 100 may wildly fluctuate its acceleration and may pass both the 1TV and the 2TV. However, the DAD 100 may not be in use for acquiring data (i.e., not slowing or remain static). The 3TV may prevent the indication that the DAD 100 is in the slowing state or the static state and remain in the dynamic state.

In another scenario, when the DAD 100 is in the slowing or static state, the DAD 100 may inadvertently experience an acceleration that would surpass the 2TV, thereby indicate that the scanner 100 is entering the dynamic state. A fourth threshold value (hereinafter "4TV") may be used to prevent this change in state when unwarranted. According to an exemplary embodiment of the present invention, an absolute value of the 2TV may be higher than that of the 1TV. Additionally, the timeout value of the 4TV may be shorter than the 3TV. Using these relative values for the 1TV, 2TV, 3TV, and 4TV, when the acceleration of the DAD 100 becomes high enough to surpass the 2TV for the time limit denoted by the 4TV, it is less likely the scanner is truly in the static state, thereby allowing the motion determining method to change the state of movement of the DAD 100 to the dynamic state.

Summarizing the above description, the DAD 100 may determine the state of movement between the dynamic state, the slowing state, and the static state using a combination of the 1TV, 2TV, 3TV, and 4TV. When determining a transition from the dynamic state to the slowing state, the motion determining method may first determine the current state to be the dynamic state and further determine if the change in acceleration along the x-axis, the y-axis, and the z-axis are less than 1TV during a time period denoted by 3TV. If such conditions apply, then the motion determining method may indicate that the DAD 100 has changed states from the dynamic state to the slowing or static state. When determining a transition from the static state to the dynamic state, the motion determining method may first determine the current state to be the static state and further determine if the change in acceleration along either the x-axis, the y-axis, or the z-axis is greater than the 2TV during a time period denoted by 4TV. If such conditions apply, then the motion determining method may indicate that the DAD 100 has changed states from the static state to the dynamic state.

Once the motion determining method determines the state of movement for the DAD 100, the data generated from the IR component 125 may be used as a subsequent step for an automatic triggering of acquiring data. While the DAD 100 is in the dynamic state, the IR component 125 may be or remain deactivated. While the DAD 100 is in the slowing state or the static state, the IR component 125 may be used. If the IR component 125 determines that the object to which data is to be acquired is within range of the DAD 100, the scanning engine 115 may be activated. With the distance of the object being determined, the scanning engine 115 may be configured so that a successful acquisition of data may be performed. For example, if the scanning engine 115 is configured for a one-dimensional barcode, the scanning engine 115 may determine a distance to which a scan is to be performed. In another example, if the scanning engine 115 is configured for a two-dimensional barcode or picture, the scanning engine 115 may determine a focusing distance to which a scan is to be performed. The automatic triggering of the scan may not be susceptible to human error of being too close or too far from the object as is often the case with a preset scanning distance that is configured to a conventional scanning engine.

Figure 2:
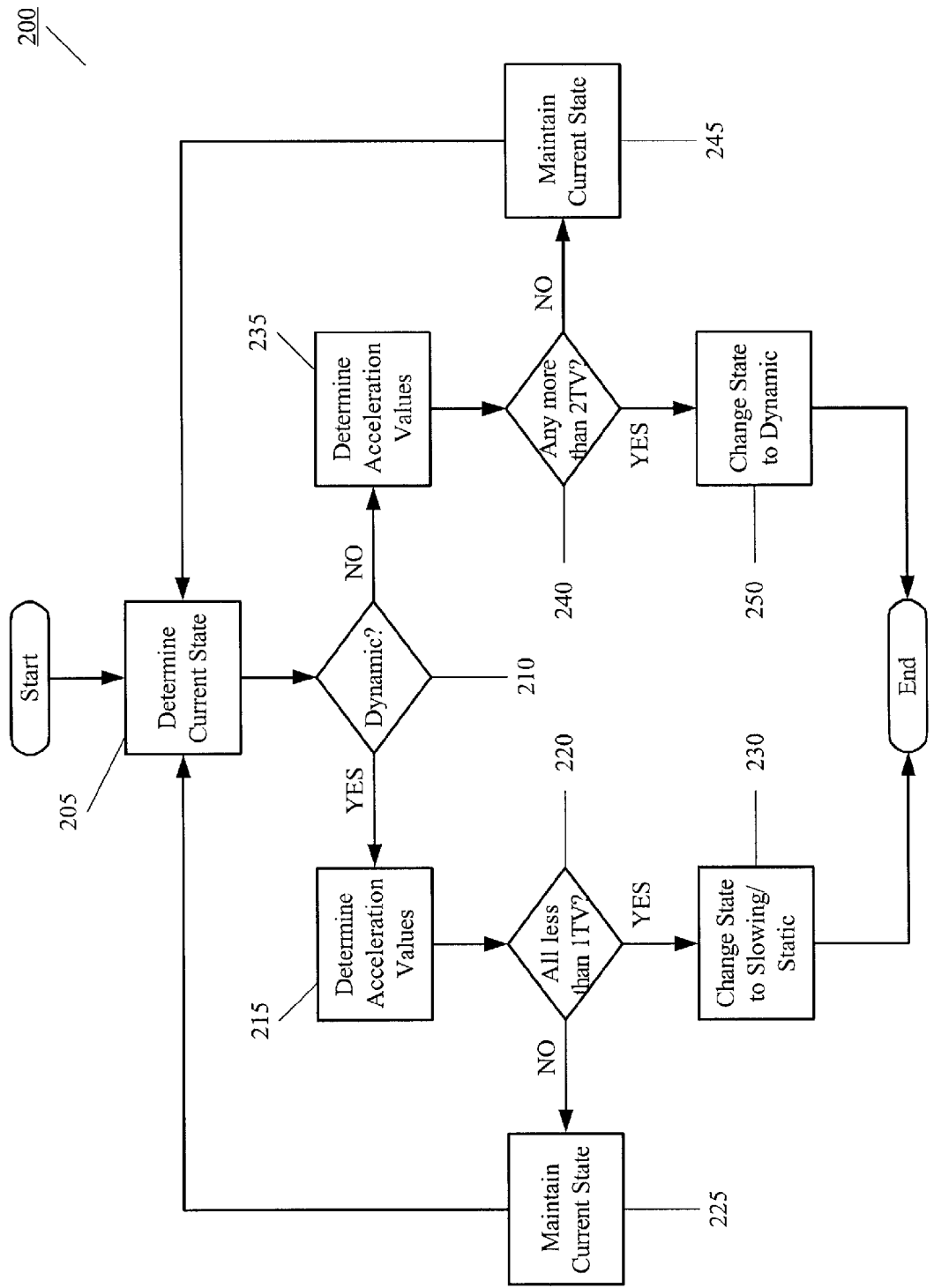
FIG. 2 shows a method for determining a state of movement for a DAD according to an exemplary embodiment of the present invention.

FIG. 2 shows a method 200 for determining a state of movement for the DAD 100 according to an exemplary embodiment of the present invention. The method 200 may be an ongoing process to determine a state of movement for the DAD 100. The method 200 will be described with reference to the motion determining method and the associated threshold values run on the processor 105 of the DAD 100.

In step 205, a current state of movement for the DAD 100 is determined. The current state of movement may have been determined using a variety of methods. For example, if the DAD 100 has recently been activated, the current state of movement may be set to a default setting such as dynamic state. In another example, because the method 200 may be ongoing, the current state of movement may be from a prior performance of the method 200.

In step 210, a determination is made whether the current state of movement for the DAD 100 is the dynamic state. If the determination is that the current state of movement is the dynamic state, the method 200 continues to step 215. If the determination is that the current state of movement is not the dynamic state, the method 200 assumes that the current state of movement is the slowing state or the static state. Subsequently, the method 200 continues to step 235.

In step 215, the acceleration values along the x-axis, the y-axis, and the z-axis are determined. As discussed above, the acceleration values of all the axes are determined as there exist scenarios where one or two of the axes may include constant acceleration values but another of the axes may include a dynamic acceleration value which may indicate that the DAD 100 remains in the dynamic state.

In step 220, a determination is made if all the acceleration values along the axes are less than the 1TV. As discussed above, to qualify that one of the acceleration values is less than the 1TV instead of an anomalous value that matches the requirement of being less, the acceleration value needs to be less than the 1TV for a duration of time which is denoted as 3TV. If at least one of the acceleration values along the axes is greater than the 1TV, the method 200 continues to step 225 where the current state of movement for the DAD 100 is maintained. If all of the acceleration values along the axes are less than the 1TV, the method 200 continues to step 230. In step 230, the state of movement for the scanner 100 is changed from the dynamic state to the slowing or static state.

Returning to step 235 when the current state of movement for the DAD 100 is the slowing or static state, the acceleration values are determined for all axes. As discussed above, each of the acceleration values for all the axes are determined. In step 240, a determination is made whether any of the acceleration values are greater than the 2TV. Again, as discussed above, to qualify that one of the acceleration values is greater than the 2TV instead of an anomalous value that matches the requirement of being greater, the acceleration value needs to be greater than the 2TV for a duration of time which is denoted as 4TV. If all of the acceleration values along the axes are less than the 2TV, the method 200 continues to step 245 where the current state of movement for the scanner 100 is maintained. If any of the acceleration values along the axes is greater than the 2TV, the method 200 continues to step 250. In step 250, the state of movement for the DAD 100 is changed from the static state to the dynamic state.

Figure 3:
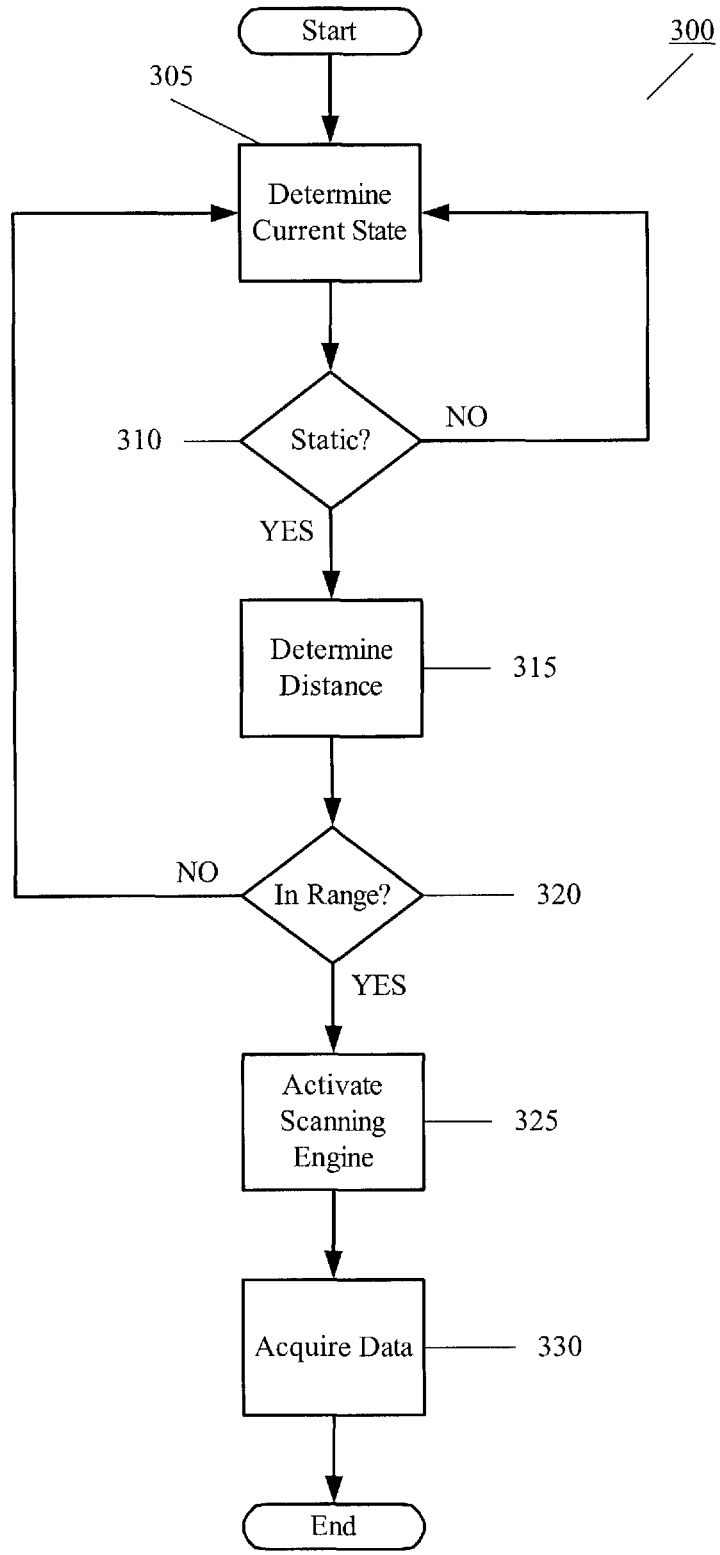
FIG. 3 shows a method for receiving data from an object according to an exemplary embodiment of the present invention.

FIG. 3 shows a method 300 for acquiring data from an object according to an exemplary embodiment of the present invention. The method 300 may be for an automatic triggering to acquire the data where preliminary configurations are made so that a successful acquisition may be performed. The method 300 will be described with reference to the DAD 100 of FIG. 1 and the method 200 of FIG. 2.

In step 305, the current state of movement for the DAD 100 is determined. As discussed above regarding the method 200, the current state of movement for the DAD 200 may be determined using a repeating process to continually monitor the state for the DAD 100. Those skilled in the art will understand that the accelerometer 120 may be activated to generate movement data using a relatively low amount of energy. Thus, the continual measurement of the current state of movement for the DAD 100 may be performed without causing an undue consumption of a portable power supply.

In step 310, a determination is made whether the current state of movement for the DAD 100 is in the static state. If the determination indicates that the DAD 100 is in the dynamic state, the method 300 returns to step 305 to again determine the state of movement for the scanner. In the dynamic state, the processor 105 may assume that an acquisition of data will not be performed since the movement of the DAD 100 will not enable the scanning engine to properly acquire the data. Furthermore, this assumption may prevent an unnecessary consumption of energy as the subsequent steps need not be performed.

In step 315, the distance to the object to which data is to be acquired is determined. As discussed above, the IR component 125 may transmit an IR beam from the IR transmitter component that is reflected off the object to the IR receiving component. If the object is within a predetermined range, a measure of distance may be recorded. If the object is not within the predetermined range, a default distance may be recorded such as zero (object too close) or infinite (object too far).

In step 320, a determination is made whether the object is within the predetermined range. If the object to which data is to be acquired is not within the predetermined range, the method 300 returns to step 305. The processor 105 may assume that an acquisition of data will not be performed since the object to is not within the predetermined range of the scanning engine 115. That is, the DAD 100 may be in a static state, such as being holstered or placed in a cradle that is not moving. However, the DAD 100 is not in a position to scan an object.

It should be noted that the IR component 120 may be placed in a passive or deactivated state until the determination from step 310 indicates that the DAD 100 is in the static state. That is, the IR component 120 may require additional energy to perform the measurement that may not be necessary should the scanner 100 be in the dynamic state.

If the determination from step 320 indicates that the object is within the predetermined range, the method 300 continues to step 325. In step 325, the scanning engine 115 is activated. The scanning engine 115 may remain in a passive or deactivated state. By placing the scanning engine 115 in this state, energy may be conserved as the scanning engine 115 may consume a relatively large amount. Once the scanning engine is activated in step 325, the method 300 continues to step 330 where the scan is performed.

The exemplary embodiments of the present invention enable an automatic triggering of a DAD that includes accurate acquisitions of data of an intended object as well as conserving as much energy as possible given the components that are used herein. The automatic triggering of the DAD may be performed when the DAD initially determines that a state of movement is in a static state which may indicate that the user has configured the scanner in such a way to perform the acquisition of data. As a further assurance that the user has configured the DAD to perform acquire the data, the DAD may further determine a distance of an object to which the data is acquired. When the state of movement and the distance measurement indicate that the DAD is properly disposed to perform an acquisition of data, the automatic triggering of the DAD may occur.

Furthermore, because a measure of distance is determined, the accurate acquisition of data may be performed. By determining the distance prior to an actual acquisition of data, the scanning engine may be configured so that a minimal number of attempts are required to properly acquire the data from the object. In addition, the methods described above enable energy conservation throughout, especially in the case where the DAD is mobile and a portable power supply is utilized. Those skilled in the art will understand that an accelerometer requires a relatively low amount of energy. Those skilled in the art will also understand that an IR component requires less energy than a scanning engine. Thus, by initially determining the state of movement following by the distance measurement and not activating the scanning engine until these determinations are made, the least amount of energy is being used.

Those skilled in the art will understand that the above described exemplary embodiments may be implemented in any number of manners, including as a separate software module, as a combination of hardware and software, etc. For example, the algorithm may be a program containing lines of code that, when compiled, may be executed on the processor 105.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A data acquisition device, comprising:
   a movement detector detecting a state of movement of the data acquisition device and generating movement data indicative of the state of movement of the data acquisition device, the state of movement being one of static and dynamic;
   a distance detector generating distance data indicative of a distance between the data acquisition device and an object to which data is to be acquired;
   a processor receiving the movement data to determine the state of movement and, when the state of movement is determined to be static, receiving the distance data to determine the distance of the object from the data acquisition device; and
   a data acquiring component triggered by the processor to automatically acquire the data from the object when the processor initially determines that the state of movement is static and subsequently determines the distance of the object from the data acquisition device is within a predetermined range.

2. The data acquisition device of claim 1, wherein the movement detector is an accelerometer.

3. The data acquisition device of claim 2, wherein the accelerometer generates the movement data for the data acquisition device in three dimensions.

4. The data acquisition device of claim 3, wherein the movement data being substantially constant determines whether the data acquisition device is static.

5. The data acquisition device of claim 3, wherein the state of movement is changed from static to dynamic if at least one of the movement data is greater than a first threshold value.

6. The data acquisition device of claim 3, wherein the state of movement is changed from dynamic to static if all of the movement data is less than a second threshold value.

7. The data acquisition device of claim 1, wherein the distance detector is an infrared (IR) component comprising a transmitter and a receiver.

8. The data acquisition device of claim 1, wherein the predetermined range sets a minimum and a maximum range in which the data acquisition device is capable of acquiring the data from the object.

9. The data acquisition device of claim 1, wherein the acquiring of the data is performed automatically as a function of the distance.

10. The data acquisition device of claim 1, wherein only the state of movement is determined if the state of movement is dynamic.

11. A method, comprising:
   determining a state of movement of a data acquisition device with a movement detector coupled to the data acquisition device, the state of movement being one of static and dynamic;
   when the determined state of movement of the data acquisition device is static, determining a distance of the data acquisition device from an object from which data is to be acquired with a distance detector; and
   when the determined distance is within a predetermined range, automatically acquiring data from the object with the data acquisition device.

12. The method of claim 11, wherein the state of movement is determined by an accelerometer.

13. The method of claim 12, further comprising:
   generating movement data by the accelerometer for the data acquisition device in three dimensions.

14. The method of claim 13, further comprising:
   changing the state of movement from static to dynamic if at least one of the movement data is greater than a first threshold value.

15. The method of claim 13, further comprising:
   changing the state of movement from dynamic to static if all of the movement data is less than a second threshold value.

16. The method of claim 11, wherein the distance is determined by an IR component comprising a transmitter and a receiver.

17. The method of claim 11, wherein the predetermined range sets a minimum and a maximum range in which the data acquisition device is capable of acquiring the data from the object.

18. The method of claim 11, wherein the acquiring of the data is performed automatically as a function of the distance.

19. The method of claim 11, wherein only the state of movement is determined if the state of movement is dynamic.

* * * * *